April 30, 1963  J. H. COOPER ETAL  3,088,020
FLASH WELDING DIE ASSEMBLIES WITH QUICKLY
REMOVABLE ELECTRODE BARS
Filed March 7, 1960  2 Sheets-Sheet 1

INVENTORS
JOSEPH H. COOPER
MELVIN M. SEELOFF

BY Francis J. Klempay
ATTORNEY

April 30, 1963

J. H. COOPER ETAL 3,088,020

FLASH WELDING DIE ASSEMBLIES WITH QUICKLY
REMOVABLE ELECTRODE BARS

Filed March 7, 1960

INVENTORS
JOSEPH H. COOPER
MELVIN M. SEELOFF

BY Francis J. Klempay

ATTORNEY

United States Patent Office 3,088,020
Patented Apr. 30, 1963

3,088,020
FLASH WELDING DIE ASSEMBLIES WITH
QUICKLY REMOVABLE ELECTRODE BARS
Joseph H. Cooper and Melvin M. Seeloff, Warren, Ohio, assignors to The Taylor-Winfield Corporation, Warren, Ohio, a corporation of Ohio
Filed Mar. 7, 1960, Ser. No. 13,111
9 Claims. (Cl. 219—97)

The present invention relates generally to the welding art and more particularly to the provision of improved welding die assemblies for flash welders.

In normal operation of a flash welder the adjacent ends of workpieces to be welded are firmly clamped by spaced welding die assemblies and, upon relative closing movement of the welding die assemblies, high amperage current is supplied thereto which causes arcing or flashing between the adjacent ends of the workpieces. The workpieces are abutted under considerable pressure which fuses and welds the same together. During such flash welding operations the electrode bars of the welding die assemblies are subjected to very large electrical currents and mechanical clamping forces along with a spattering of welding flash which becomes encrusted thereon. Such electrode bars must be removed for reworking and replaced at various intervals due to the adverse operating conditions to which the same are subjected.

It is the primary or ultimate object of this invention to provide flash welding die assemblies embodying means for quickly and easily removing and/or replacing the electrode bars thereof. Heretofore the procedures involved in removing and replacing the electrode bars have been characterized by their extreme complexity and have resulted in substantial down time of the flash welders. This is particularly objectionable when a flash welder is employed in a continuous processing line since the down time of the flash welder interrupts the production of the entire line.

Another object of this invention is to provide flash welding die assemblies with removable electrode bars wherein the electrode bars are maintained in properly assembled relation with respect to the other portions of the flash welding die assemblies in a positive and rigid manner during welding operations but yet these electrode bars are easily removed and/or replaced in a minimum of time whenever desired. As will be hereinafter more fully explained, each of the electrode bars is forced against the housing member of the flash welding die assembly by a fluid motor acting through suitable linkage means.

Still another object of this invention is to provide apparatus of the character described which is highly compact and of inexpensive and simplified construction.

The above, as well as other objects and advantages, will become more readily apparent upon consideration of the following specification and accompanying drawing wherein there is disclosed a preferred embodiment of flash welding die assemblies constructed in accordance with the teachings of this invention.

Figure 1:
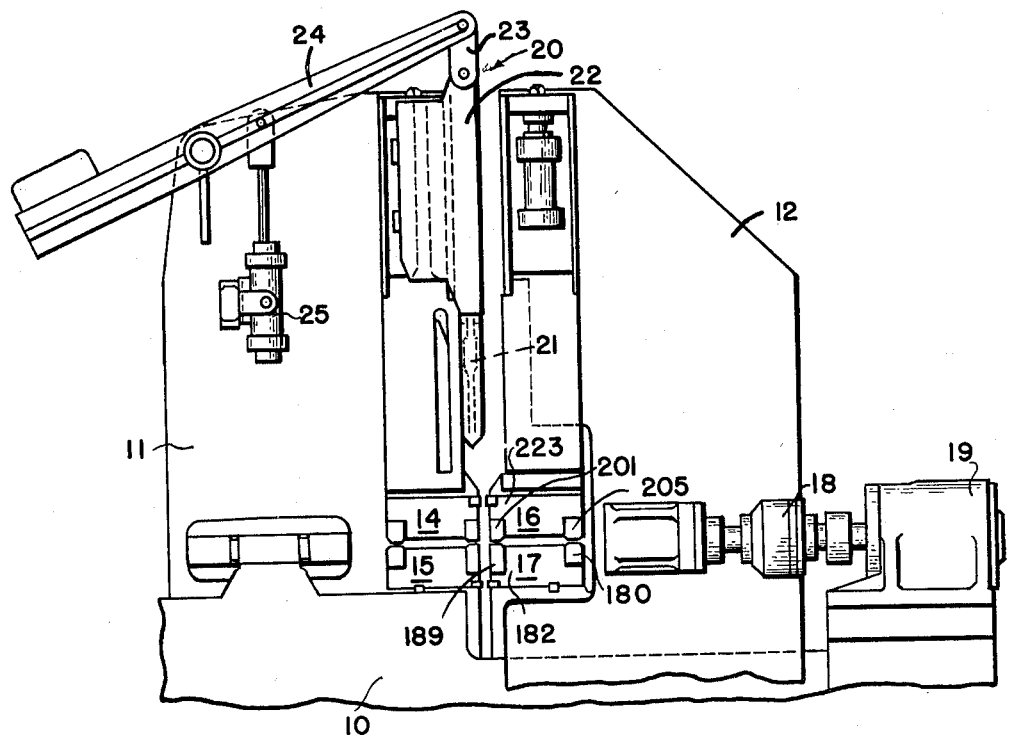
FIGURE 1 is a fragmentary side elevation of a flash welder embodying flash welding die assemblies with quickly removable electrode bars.

Referring now to the drawing, and initially to FIGURE 1 thereof, the reference numeral 10 designates a fixed base upon which is mounted a stationary housing 11 and a movable housing 12. The stationary housing 11 carries a pair of upper and lower flash welding die assemblies 14 and 15, respectively, while the movable housing 12 mounts a similar pair of upper and lower flash welding die assemblies 16 and 17. It will be understood that the adjacent ends of workpieces are adapted to be clamped between the pairs of flash welding die assemblies 14, 15 and 16, 17. Suitable apparatus as is necessary to effect relative movement between the upper and lower flash welding die assemblies and to apply adequate clamping pressure is, of course, provided. This apparatus is not specifically disclosed in the present application but a preferred structure for this purpose is disclosed in U.S. Patent No. 2,710,903, which is assigned to the assignee of this invention.

The movable housing 12 is adapted to be moved on the base 10 toward and away from the stationary housing 11 by a pair of independently operable fluid cylinders 18 and 19. The method of an apparatus for actuating the movable housing 12 is disclosed in more detail in U.S. Patent No. 2,794,111, which is assigned to the assignee of the present invention.

The stationary housing 11 mounts a gauge bar means generally designated by the reference numeral 20 which comprises a stepped spacer bar 21 that extends transversely across the normal path of workpiece travel and which is rigidly secured at its upper end to a vertically disposed carrier 22. The carrier 22 is loosely guided for vertical movement and pivotally secured to the upper end thereof is a short link 23 which is in turn pivotally attached to a lever arm 24. A fluid cylinder 25 is adapted to vertically pivot the lever arm 24 which causes the carrier 22 and spacer bar 21 to move vertically and also horizontally to a certain extent since there is a horizontal component in the arcuate movement of the lever arm 24. The spacer bar 21 may comprise a plurality of stepped parallel gauge faces for very accurately and quickly gauging the spacing between the adjacent ends of the workpieces. The construction and operation of the gauge bar means 20 is fully described in U.S. Patent No. 2,758,184, which is also assigned to the assignee of this invention.

In the overall operation of the flush welder, the trailing end of a workpiece is moved past the center line of the pairs of welding die assemblies. The spacer bar 21 is moved downwardly into a gauging position between the pairs of welding die assemblies and the trailing end of the workpiece is moved against the spacer bar. After the workpiece has been centered, the upper welding die assembly 14 is lowered into clamping relation with respect to the workpiece and the lower welding die assembly 15. The leading end of a succeeding workpiece is now advanced into abutting relation with the spacer bar 21, is centered and then is very rigidly clamped when the upper welding die assembly 16 is lowered. The movable housing 12 is moved rearwardly upon proper actuation of the fluid cylinder 18 and the spacer bar 21 is retracted. The movable housing 12 is then advanced toward the stationary housing 11 and electrical current is supplied by conventional means, not shown, to the electrode bars of the welding die assemblies to cause arcing or flashing between the adjacent ends of the workpieces. The ends of the workpieces are softened by this flashing or arcing and upon continued movement of the movable housing 12 these ends are caused to abut and the fluid cylinder 19 provides the necessary upset force which fuses and welds the workpieces.

Figure 2:
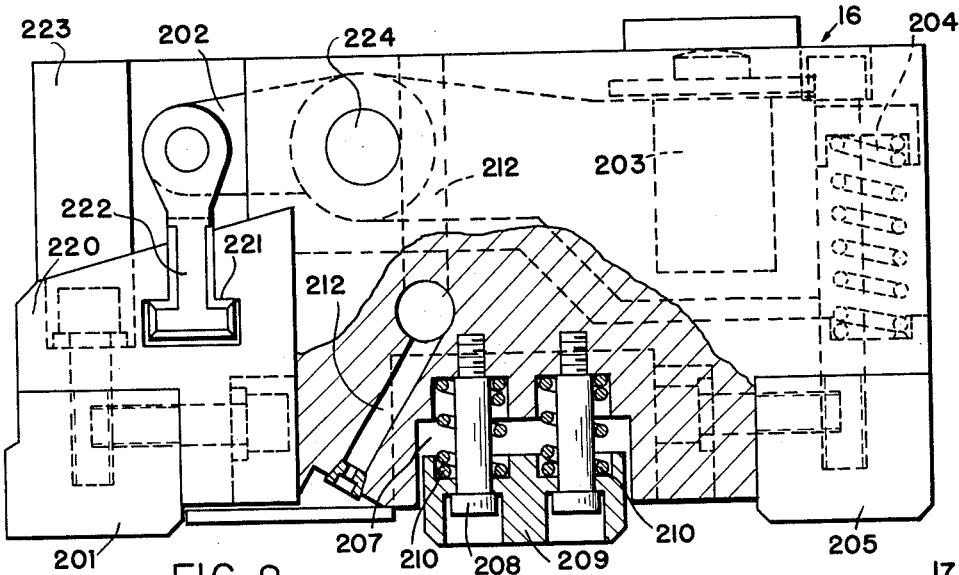
FIGURES 2 and 3 are fragmentary side views, partially in section, of the upper and lower welding die assembly, respectively, mounted on the movable housing of the flash welder shown in FIGURE 1.
Figure 3:
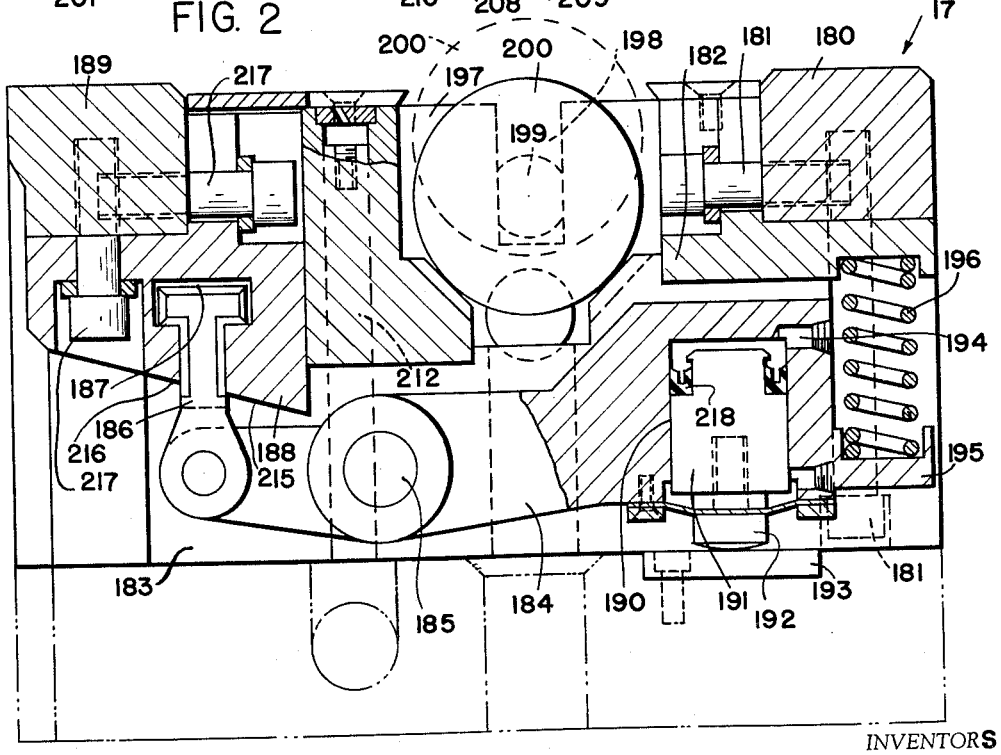

Referring now to FIGURES 2 and 3 of the drawing, there are shown enlarged sectional views of the upper and lower welding die assemblies 16 and 17 which are mounted on the movable housing 12. The pair of upper and lower welding die assemblies 14 and 15 carried by the stationary housing 11 are identical to the welding die assemblies 16 and 17 and, to avoid unnecessary repetition in the specification and duplication in the drawing, only the upper and lower welding die assemblies 16 and 17 will be described in detail.

The lower welding die assembly 17 comprises a pressure bar 180 that extends transversely across and beneath the normal path of workpiece travel which is rigidly attached by bolts 181 to a housing member 182. The housing member 182 has a generally block-like configuration and is machined or otherwise formed to provide a longitudinally extending slot 183 in the bottom thereof which nestingly receives a longitudinally extending lever or bell crank 184. The lever 184 is pivotally attached intermediate its ends to the housing member 182 by means of a transverse pivot pin 185. Pivotally attached to the forward end of the lever 184 is an upwardly extending T-shaped arm 186 whose headed upper end is loosely received within an enlarged and transversely extending T-shaped recess 187 that is provided in the bottom of an electrode bar carrier 188. The electrode bar carrier 188 has a downwardly sloping bottom surface 215 which is adapted to rest against and nest with a similar and mating surface 216 of the housing member 182. It will be noted that the housing member 182 has a transversely extending recess at the forward end thereof which is adapted to receive the electrode bar carrier 188. Rigidly bolted to the electrode bar carrier 188 by means of bolts 217 is a transversely extending electrode bar 189 which is preferably fabricated from a highly current conductive material.

The rear end of the lever 184 is enlarged and machined to provide a vertically extending recess which defines a cylinder housing 190. Received within the cylinder housing 190 is a piston 191 which, in combination with an annular sealing element 218, define a fluid motor adapted to apply an upwardly directed moving force to the rear end of the lever 184. The piston 191 carries a downward projecting headed member 192 which engages a stop plate 193. Fluid under pressure is introduced into the fluid chamber through a passageway 194 whereby the rear end of the lever 184 is forced upwardly and the forward end of this lever is pulled downwardly to very tightly seat and wedge the electrode bar carrier 188 against the housing member 182. In this manner the electrode bar 189 is positively and very rigidly maintained in proper operating position with respect to the housing member 182. The piston 191 of the fluid motor is retained in the same relative position at all times due to the engagement between the headed member 192 and stop plate 193 while the lever 184 is caused to pivot about the pivot pin 185. The loose fit between the T-shaped recess 187 in the electrode bar carrier 188 and the T-shaped arm 186 allows the electrode bar carrier to be drawn into very tight and rigid relation with respect to the housing member 182.

The extreme rear end of the lever 184 terminates in a cup-shaped extension 195 which receives one end of a vertically extending coil spring 196. The coil spring 196 extends between the cup-shaped extension 195 and the housing member 182 and is operative to exert a downward moving force on the rear end of the lever 184. When fluid is supplied to the fluid motor, the rear end of the lever is forced upwardly against the biasing force exerted by the spring 196. However, when fluid pressure is relieved from the fluid chamber, clamping force is removed from the electrode bar carrier and the spring 196 pivots the rear end of the lever 184 downwardly and, of course, the forward end of this lever is pivoted upwardly to loosen the electrode bar carrier 188 from the housing member 182. At this time the electrode bar carrier 188 is loosely and floatingly mounted with respect to the housing member 182. To remove the electrode bar, it is only necessary to pull the electrode bar carrier 188 transversely outward from the position shown in FIGURE 3 of the drawing. Then a replacement electrode bar carrier and electrode bar can be inserted and such replacement is greatly facilitated by the loosely fitting and cooperating T-shaped arm 186 and T-shaped recess 187. Fluid under pressure is again supplied to the fluid motor whereby the rear end of the lever 184 is forced upwardly to tightly wedge the replacement electrode bar carrier against the housing member 182.

The housing member 182 is fabricated to define a generally triangular and transversely extending recess 197 positioned intermediate the electrode bar 189 and the pressure bar 180. Suitable side portions enclose the ends of the triangular recess 197 and define vertically extending slots 198 which receive and guide a vertically movable and transversely extending mounting rod 199. Journaled on the mounting rod 199 is a workpiece supporting roll which, when the welding die assemblies 16 and 17 are separated, is biased upwardly by any convenient biasing means to an extended position as shown by the broken lines in FIGURE 3 of the drawing. The workpiece supporting roll 200 maintains the workpieces in elevated relation with respect to the electrode and pressure bars. The above arrangement substantially reduces the amount of wear on the electrode and pressure bars and very effectively protects the same from damage by the moving workpieces. During flash welding operations when the upper welding die assembly is lowered into clamping relation with respect to the lower welding die assembly, the workpiece supporting roll 200 is caused to retract into the recess 197 and out of interfering relation with respect to the workpieces. The workpiece supporting roll 200 also serves as a means for quickly separating the workpiece from the electrode and pressure bars after welding operations are completed.

The upper welding die assembly 16 is quite similar to the lower welding die assembly 17 in that an electrode bar 201 is bolted to an electrode bar carrier 220 having a T-shaped recess 221 in the top thereof. Loosely received in the recess 221 is a T-shaped arm 222 which is pivotally connected to the forward end of a lever 202. The lever 202 is in turn pivotally mounted by a transversely extending pivot pin 224 to a housing member 223. A fluid motor 203 is formed in the rear end of the lever 202, which fluid motor is of the same construction as the fluid motor in the rear end of the lever 184. Fluid under pressure is normally supplied to the fluid motor 203 whereby the rear end of lever 202 is forced downwardly and the electrode bar carrier 220 is pulled upwardly into tight wedging engagement with a cooperating transversely extending channel in the housing member 223. A coil spring 204 is provided at the rear end of the lever 202 to loosen the electrode bar carrier 220 from the housing member 223 when the fluid pressure is relieved from the fluid motor 203. As should be apparent, the T-shaped arm 222 and recess 221 cooperate to prevent the electrode bar carrier 220 and electrode bar 201 from dropping onto the lower welding die assembly 17 and/or the moving workpiece after fluid pressure is exhausted from fluid motor 203. Also, the T-shaped arm 222 provides guide surfaces which allow the electrode bar carrier 220 to be moved transversely from and into the flash welder. A pressure bar 205 is stationarily mounted at the rear end of the housing member 223 by a plurality of bolts and is adapted to cooperate with the pressure bar 180 of the lower welding die assembly.

The housing member 223 of the upper welding die assembly has a transversely extending and generally rectangular recess 207 formed therein between the electrode bar 201 and the pressure bar 205. Extending downwardly into the recess 207 are pairs of headed bolts 208 which slidably mount a transversely extending and vertically movable stripper plate 209. Compression coil springs 210 encircle the bolts 208 to normally maintain the stripper plate 209 in its extended position whereby the pressure and electrode bars 201 and 205 are protected from damage by the moving workpieces when the upper and lower welding die assemblies are separated. However, during welding operations the stripper plate 209 will be retracted into the recess 207 out of interfering relation with respect to the workpiece and the electrode and pressure bars. The stripper plate also serves to very quickly push the workpiece from the electrode and pressure bars after a welding operation is completed.

Suitable passageways 212 are provided in both of the welding die assemblies 15 and 16 and these passageways terminate in ports disposed between the stripper plate and the workpiece supporting roll and the electrode bars. The passageways 212 are connected by suitable conduits, not shown, to a source of compressed air and the arrangement is such that the ends of the workpieces are subjected to strong air blasts across the entire widths thereof as the same move through the entry side welding die assemblies. These air blasts are employed to remove any dirt or the like from the ends of the workpieces prior to actual flash welding operations since the presence of any foreign matter at the point of weld is highly objectionable if successful welding operations are contemplated.

Figure 4:
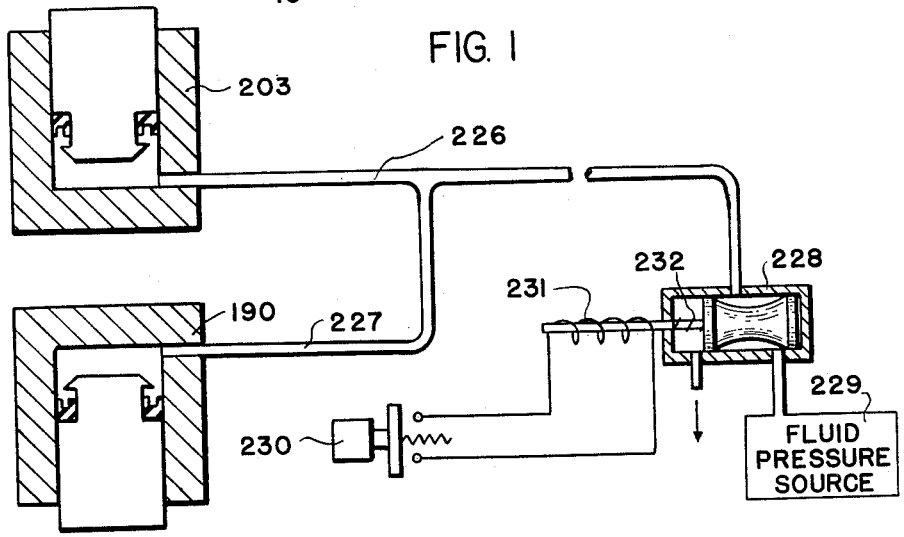
FIGURE 4 is a schematic of representative control means which may be employed to quickly release the electrode bars for removal and/or replacement.

Referring now to FIGURE 4 of the drawing, there is shown in schematic fashion a control circuit for the fluid motors 190 and 203 of the welding die assemblies 16 and 17. The chambers of these fluid motors are connected by conduits 226 and 227 to one port of a solenoid operated valve 228. When the spool of the valve 228 is in the position shown, fluid under pressure is supplied from a suitable source 229 thereof to the chambers of the fluid motors 190 and 203. In this manner the electrode bar carriers 188 and 220 are maintained in very tight assembled relation with respect to the housing members 182 and 223, respectively. However, when a push button 230, or any other suitable control means, is actuated a solenoid 231 will be energized to shift the valve spool whereby the fluid chambers of the motors 190 and 203 will be connected to exhaust. At this time, as has been previously explained, either one or both of the electrode bar carriers and the electrode bars mounted thereon may be removed by simply moving the same transversely and replaced by similar components in the same manner. When the push button 230 is released, the valve spool will be returned to its initial position under action of a spring 232 whereby fluid under pressure will again be supplied to the chambers of the fluid motors 190 and 203 from the fluid pressure source 229 to maintain the electrode bars and the electrode bar carrier in very accurate and tightly assembled relation with respect to the housing members of the welding die assemblies.

It should be apparent that the objects initially set forth have been accomplished. Of particular importance is the provision of electrode bars for flash welders which may be easily and readily removed in a minimum of time and with a minimum of effort but yet which are maintained in assembled relation with respect to the housing members of the welding die assemblies in an improved manner. Also, there has been disclosed a highly advantageous and improved means for supporting the workpieces in vertically spaced relation with respect to the electrode and pressure bars to protect these members against damage when the welding die assemblies are separated. Air passageways in the entry side pair of welding die assemblies allow the ends of the workpieces to be subjected to air blasts in order that dust and other foreign matter is removed therefrom.

Of course, many changes may be made in the illustrated embodiment of the invention without departing from the clear teachings thereof. For example, multiple levers could be provided for each of welding die assemblies if the transverse dimensions thereof, which, of course, are determined by the width of the workpieces being welded makes the same advisable. Accordingly, reference should be had to the following appended claims in determining the true scope and intent of the invention.

We claim:
1. A flash welding die assembly comprising a housing member adapted to be disposed on one side of a normal path of workpiece travel, a removable and replaceable electrode bar assembly, and force applying means mounted on said housing member operative upon actuation thereof to retain said electrode bar assembly in tightly assembled relation with respect to said housing member, said housing member having a transversely extending recess therein, said electrode bar assembly being nestingly received in said recess, and said force applying means being operative upon actuation thereof to tightly seat said electrode bar assembly in said recess in said housing member, said force applying means comprising a lever pivotally mounted to said housing member intermediate its ends, means interconnecting one end of said lever with said electrode bar assembly, and actuating means connected to the other end of said lever adapted to pivot the same.

2. Apparatus according to claim 1 further comprising characterized in that said actuating means comprises a recess in said other end of said lever, a piston slidably received in said recess, stationary stop means engaging said piston, and means to supply fluid under pressure to said fluid motor.

3. Apparatus according to claim 1 further comprising biasing means acting against said other end of said lever in opposition to the moving forces exerted thereon by said actuating means.

4. Apparatus according to claim 1 further characterized in that said means interconnecting comprises a recess and a headed member on adjacent portions of said electrode bar carrier and said lever and said recess being larger than said headed member to allow relative sliding movement therebetween whereby said electrode bar assembly may be removed.

5. A welding die assembly for flash welding strip in end-to-end relation comprising a housing member adapted to extend transversely of the strip and adjacent thereto, a V-shaped recess in said housing extending transversely of the strip, an elongated carrier which is wedge-shaped received within said recess and rigidly mounting an electrode bar for clamping and conducting current to the strip, said carrier having a T-shaped slot therethrough extending from end-to-end thereof, T-shaped hold-down members received within said slot, and quick-releasable means interconnecting said housing and said hold-down members to releasably clamp said carrier in said recess, the arrangement being such that upon the release of hold-down force on said members said carrier and mounted electrode bar may be readily withdrawn from the flash welding machine along a path extending transversely of the strip.

6. In flash welding apparatus comprising a pair of relatively longitudinally movable housings, each of said housings mounting a pair of welding die assemblies disposed above and below the normal path of workpiece travel, means to effect relative vertical movement between the ones of each of the pairs of said welding die assemblies to clamp workpieces therebetween, each of said welding die assemblies comprising a housing member and an electrode bar assembly; the improvement in each of said welding die assemblies comprising means to quickly release said electrode bar assembly for removal and replacement, said electrode bar assembly comprising an electrode bar carrier mounting an electrode bar, said housing member having a transversely extending recess therein, means to releasably clamp said carrier in said recess and thus releasably hold said electrode bar assembly in said recess, said means to releasably hold comprising a lever having a pair of ends, means attaching one end of said lever to said electrode bar carrier, pivot means pivotally mounting said lever intermediate ends thereof from said housing member, and power means acting on the other end of said lever.

7. Apparatus according to claim 6 further characterized in that said means attaching comprises a T-shaped recess in said electrode bar carrier, a T-shaped arm pivotally attached to said one end of said lever, and said T-shaped recess slidably receiving said T-shaped arm whereby said electrode bar carrier may be removed from said housing member.

8. Apparatus according to claim 6 further characterized in that said power means comprises a recess in said other end of said lever, a piston slidably received in said recess to define a fluid motor, said piston engaging stop means, and means to supply fluid under pressure to said fluid motor.

9. Apparatus according to claim 8 further comprising biasing means acting on said other end of said lever in opposition to the moving forces exerted thereon by said fluid motor.

References Cited in the file of this patent

UNITED STATES PATENTS

| | | |
|---|---|---|
| Re. 20,348 | Hoffer | May 4, 1937 |
| 458,176 | Lemp | Aug. 25, 1891 |
| 985,838 | Rietzel | Mar. 7, 1911 |
| 2,314,656 | Morton | Mar. 23, 1943 |
| 2,422,928 | Rogati | June 24, 1947 |
| 2,655,583 | Souter | Oct. 13, 1953 |
| 2,794,111 | Seeloff et al. | May 28, 1957 |
| 2,810,062 | Kaunitz | Oct. 15, 1957 |
| 2,877,337 | Evans | Mar. 10, 1959 |